F. W. PALMER.
Hay Fork.
No. 77,906.
Patented May 12, 1868.
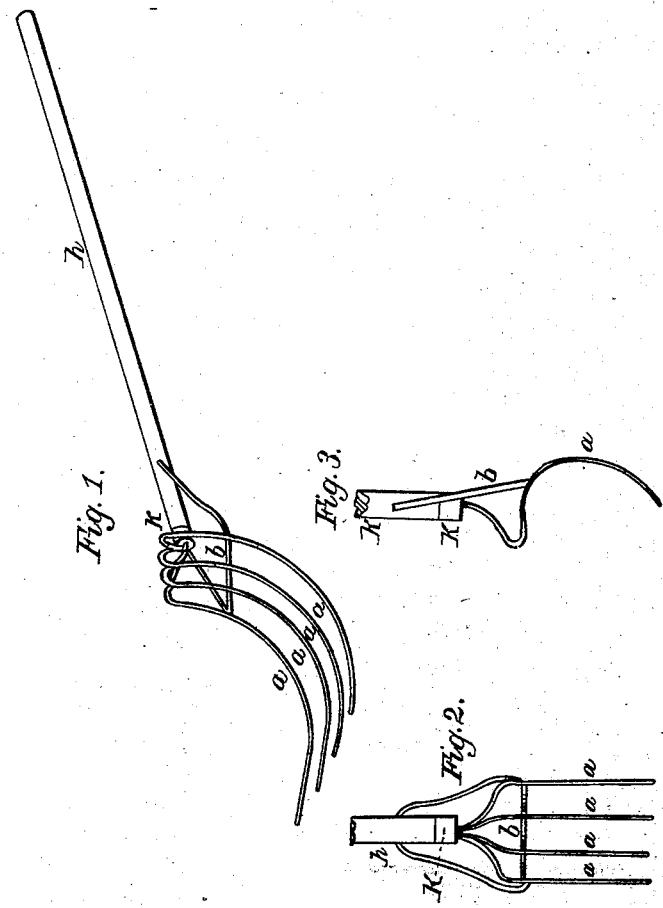

United States Patent Office.

FREDERICK W. PALMER, OF WEST RICHMONDVILLE, NEW YORK.

Letters Patent No. 77,906, dated May 12, 1868.

IMPROVEMENT IN HAND-FORKS.

The Schedule referred to in these Letters Patent and making part of the same.

TO ALL WHOM IT MAY CONCERN:

Be it known that I, FREDERICK W. PALMER, of West Richmondville, in the county of Schoharie, and State of New York, have invented new and useful Improvements in Hand-Forks; and I do hereby declare that the following is a full and complete description of the construction and operation of the same, reference being had to the accompanying drawings, making part of this specification, in which—

Figure 1 is a perspective view, and
Figure 2 a front view, and
Figure 3 a side view.
Like letters refer to like parts in the several views.

The handle, $h$, is of suitable size, and any convenient length for a hand-fork. Into this handle, tines, $a\ a\ a\ a$, are inserted, which from the end of the handle, $h$, where they are united together to form the shank $k$, diverge, and extend upward above the horizontal handle $h$ any desirable length; thence with a short curve they descend below the handle $h$ a distance graduated by the desired capacity of the fork, and extend forward in a larger curve, which diminishes in curvature to their points. From the short curve, near the handle $h$, the tines $a\ a\ a\ a$ are exactly or approximately parallel to each other.

To the back side of the tines $a\ a\ a\ a$, at a suitable distance below the shank $k$, is fastened a cross-bar, $b$, from the ends of which braces, $c\ c$, extend back in converging lines, and, meeting at the handle $h$, are fastened firmly to it.

This fork as constructed is designed for gathering cut grain in the field into gavels, and putting them on to the load, or putting loose grain on to the load when collected by any other method.

The fork may be made with two or three tines, either extending first above, or dropping immediately below the handle $h$, with a separate brace to each tine $a$, or without any braces, as the strength of the tines, and the use designed may require.

From its construction, this fork is intended to excel in the ease and efficiency of operating it. In placing it into or under the commodity to be moved, the usual stooping is avoided.

In the process of elevating, the centre of gravity of the weight falls below the line of the power, shifting as the elevation proceeds, until, reaching the perpendicular, they coincide. In this position the gavel, for instance, rests securely in the curve of the fork, without any liability, at any stage of the process, to wring or writhe in the hands.

When drawn from the mow or load bottom upward, which is usually the most convenient mode, it is not liable to catch into and detach litter from it.

It will be found a valuable auxiliary in handling hay, grain, straw, chaff, and other substances with ease and dispatch.

What I claim as my invention, and desire to secure by Letters Patent, is—

A hand-fork, substantially as described, for the purposes set forth.

In testimony whereof, I have signed my name to this specification in the presence of two subscribing witnesses.

FREDERICK W. PALMER.

Witnesses:
PETER HILSENGER,
SAMUEL CAMPAIGN.